United States Patent [19]
Veronesi et al.

[11] Patent Number: 5,289,068
[45] Date of Patent: Feb. 22, 1994

[54] TWO-STAGE SUBMERSIBLE PROPULSOR UNIT FOR WATER VEHICLES

[75] Inventors: Luciano Veronesi, O'Hara Twp., Allegheny County; Allen L. Morris, Shaler; Raymond M. Calfo, Murrysville, all of Pa.

[73] Assignee: Westinghouse Electric Corp., Pittsburgh, Pa.

[21] Appl. No.: 571,969

[22] Filed: Aug. 23, 1990

[51] Int. Cl.[5] .................. H02K 16/00; B63H 5/10; B63H 11/103; F04D 19/02
[52] U.S. Cl. .................................... 310/114; 310/87; 310/90; 440/38; 440/80; 384/97
[58] Field of Search ............... 310/87, 90, 114; 384/97, 398, 465, 472; 440/6, 38, 80, 83

[56] References Cited
U.S. PATENT DOCUMENTS

| | | |
|---|---|---|
| 1,996,195 | 5/1933 | Ferguson . |
| 2,537,310 | 1/1951 | Lapp . |
| 3,143,972 | 8/1964 | Smith et al. . |
| 3,708,251 | 1/1973 | Pierro . |
| 4,360,751 | 11/1982 | Arnold, Jr. et al. . |
| 4,389,197 | 6/1983 | Ballantine ............... 440/38 |
| 4,459,087 | 1/1984 | Barge . |
| 4,831,297 | 5/1989 | Taylor et al. ............ 310/87 |
| 4,876,492 | 10/1989 | Lester et al. ............ 310/62 |
| 4,993,848 | 2/1991 | John et al. .............. 384/97 |

FOREIGN PATENT DOCUMENTS

| | | |
|---|---|---|
| 62-6892 | 1/1987 | Japan ..................... 440/38 |
| 171141 | 7/1988 | Japan ..................... 310/114 |
| 1439806 | 6/1973 | United Kingdom . |

OTHER PUBLICATIONS

Brochure of Jastram-Werke GmbH KG entitled "Jastram Forschung-From the Idea to the Marketable Product" dated Aug. 1988.

Primary Examiner—Steven L. Stephan
Assistant Examiner—D. L. Rebslh

[57] ABSTRACT

A two-stage submersible propulsor unit comprises a shroud having a water inlet and a water outlet, a shaft assembly centrally mounted within the shroud, an upstream and a downstream propeller, each of which includes a separate hub rotatably mounted on the shaft assembly, first and second electric motors separately rotating the upstream and the downstream propellers. Each motor includes a rotor mounted around the outer periphery of one of the propellers and a stator mounted around the shroud, and first and second thrust bearing assemblies for absorbing the thrust load generated between the hubs of the first and second propellers and the shaft assembly. Both thrust bearing assemblies are contained within a housing located on the downstream end of the shaft assembly. The shaft assembly includes a stationary outer shaft where the first and the second propellers are rotatably mounted, and a rotatable inner shaft which is connected to the hub of the upstream propeller for transferring thrust from the upstream propeller to the first thrust bearing assembly located in the downstream end of the shaft assembly. The foregoing arrangement advantageously avoids positioning a thrust bearing assembly in front of the upstream propeller which in turn would interfere with the smooth flow of water into the unit, and create noise.

25 Claims, 4 Drawing Sheets

TWO-STAGE SUBMERSIBLE PROPULSOR UNIT FOR WATER VEHICLES

BACKGROUND OF THE INVENTION

This invention relates to submersible propulsor units, and is specifically concerned with a high power, low noise two-stage submersible propulsor unit that is particularly adapted to provide secondary propulsion for submarines and other special vehicles.

Electric motor type propulsor units are known in the prior art. While such propulsors may be used for surface vessels, they find their primary application as secondary drive units for submarines where reliability, low noise emissions, and shock resistance are at a premium. In the prior art, such propulsor units have typically comprised a "canned" or wet-winding type electric motor having an output shaft that is connected to a propeller. Unfortunately, the fact that the canned motor is disposed either directly in front of or behind the flow of water generated by the propeller creates an obstruction to fluid flow that results in unwanted noise, and reduces the effective thrust that can be generated by these units. To compensate for the thrust losses caused by this blockage, higher speed and smaller diameter motors may be used. However, the high shaft speed of these motors results in a high propeller cavitation, which in turn generates an even higher level of unwanted noise.

To overcome these shortcomings, the Westinghouse Electric Corporation developed an integral motor propulsor unit that is disclosed and claimed in U.S. Pat. No. 4,831,297. This particular propulsor unit resembles a jet engine in structure and generally comprises a cylindrical shroud having a water inlet and a water outlet, a propeller having a hub rotatably mounted within the shroud on a shaft that is concentrically mounted within the shroud by a plurality of support vanes, and an electric motor for driving the propeller that includes an annular rotor mounted around the periphery of the propeller blades, and a stator that is integrated within the shroud of the unit. The advanced design of this particular prior art propulsor unit substantially increases the thrust output for a propulsor for a given weight and size while at the same time reducing the amount of noise generated due to the largely unencumbered flow of water that the propeller of the device can force through the fluid-dynamically shaped shroud. The quietness of the unit is further improved due to the noise-blocking characteristics of the shroud.

While the aforementioned integral motor propulsor unit provides a substantial advance in the art, the applicants have noted a number of limitations associated with the design of this unit which impair its usefulness in submarine applications. For example, if the thrust output of such a prior unit could be substantially increased, and noise emissions reduced, the uses of the unit could be expanded beyond emergency backup applications and maneuvering applications. Such an increased thrust capacity would allow it to become a truly redundant thrust system should the need arise to take the primary thrust system of the submarine off-line. Of course, such prior art propulsor units could be upscaled to produce more power. However, for certain submarine applications, there are limitations with respect to the width of the propulsor unit which do not allow such an overall upscaling of the device to solve the problem of the need for increased thrust. Specifically, as the width of the propulsor unit increases, the unit as a whole exposes more and more area to fore and aft shock waves that military submarines might be exposed to during combat. Still another limitation resides in the fact that the initial flow of sea water into the propeller within the shroud must be substantially if not completely unencumbered in order to avoid the generation of an unacceptably large amount of unwanted noise caused by cavitation in the inflowing water. Such cavitation may be induced, for example, by upstream support vanes which secure the propeller shaft to the inner diameter of the shroud, or by bearing arrangements which require an enlargement in the upstream end of the propeller shaft. Still another limitation associated with such prior art propulsor units resides in the design of the water lubricated thrust and radial bearings which periodically need to be maintained or replaced. To perform such maintenance or replacement, the unit must be dry docked, and the mechanical arrangement of these bearing components necessitates an almost complete disassembly of the propulsor unit. Finally, the applicants have further observed that the design of the electric motors used in such prior art propulsor units necessitates a very close spacing between the outer diameter of the rotor and the inner diameter of the stator if the electromagnetic coupling between the rotor and the stator is to be effectively implemented. However, such close spacing not only creates drag forces from the thin film of water that is disposed between the stator and the rotor; it also generates additional unwanted noises by increasing the magnitude of harmonic currents flowing through the rotor (which are always present to some degree due to the dissymmetries in the magnetic fields generated by the stator) which in turn causes the rotor to vibrate. The close spacing required between the inner diameter of the stator and the outer diameter of the rotor also creates an unwanted area of vulnerability in the propulsor unit should it be subjected to a high level of mechanical shock, or should salt water debris collect between the stator and the rotor.

Clearly, there is a need for an improved, integral motor-type propulsor unit for use in submarines or other water vessels which maintains all the advantages associated with the latest prior art propulsor unit, but which is capable of generating larger amounts of thrust with a mechanism which does not exceed the maximum width limitations associated with submarine applications. Ideally, such a propulsor unit would have a lower noise signature than prior art units, and would incorporate a design which does not necessitate such close spacing between the rotor and stator in order to decrease the vulnerability of the unit in this region to mechanical shock, or the collection of sea water debris. The bearing assemblies should be easily accessible in the event that a repair or a maintenance operation were necessary without the need for dry docking the unit, or for a large amount of disassembly of the unit. Finally, it would be desirable if the unit were capable of more efficiently generating usable thrust, and were more reliable than prior art propulsor units.

SUMMARY OF THE INVENTION

Generally speaking, the invention is a two-stage submersible propulsor unit that overcomes the limitations associated with the prior art. The submersible propulsor unit of the invention comprises a shroud having a water inlet and a water outlet, a shaft assembly concentrically mounted within the shroud, upstream and downstream propellers, each of which includes a separate hub rotatably mounted on the shaft assembly, and upstream and downstream electric motors for separately rotating the upstream and downstream propellers, wherein each motor includes a rotor mounted around the outer periphery of one of the propellers, and a stator mounted around the shroud, and first and second thrust bearing assemblies for absorbing the thrust load generated between the hubs of the first and second propellers and the shaft assembly, respectively, wherein the thrust bearing assemblies are both located on the downstream end of the shaft assembly. The shaft assembly includes a stationary outer shaft where the hubs of the upstream and downstream propellers are rotatably mounted, and a inner shaft that is rotatably with respect to the outer shaft and which is connected to the hub of the upstream propeller for transferring thrust from the upstream propeller to the first thrust bearing assembly. This arrangement avoids the necessity of locating a thrust bearing assembly on the upstream end of the shaft assembly which would create cavitation in the water flowing into the upstream propeller, thereby generating unwanted noise. To compensate for any off-center distances between the hub of the upstream propeller and the rotatable inner shaft, these two components are preferably interconnected by means of a universal joint.

Two sets of vane members support the shaft assembly within the shroud, and all of the vane members are located downstream of the upstream propeller to reduce the noise generated by the unit. A first set of vane members interconnects a portion of the shaft assembly disposed between the hubs of the upstream and downstream propellers to the inner walls of the shroud, while a second set of vane members interconnects a housing that surrounds the first and second thrust bearings located at the downstream end of the shaft assembly to the inner walls of the shroud. Such sturdy, two-point mounting between the shaft assembly and the inner walls of the shroud advantageously helps to render the propulsor unit resistant to mechanical shock. Additionally, the second set of vane members are preferably fluidically shaped to convert the swirling flow of water expelled from the outlet of the downstream propeller to an axial flow of water. The downstream of the shaft assembly preferably defines a fluted, converging nozzle which breaks up the single, exhaust jet of water into a number of smaller jets which further reduces the amount of noise generated by the unit during its operation.

To increase the power and further reduce the noise created by the unit during its operation, each of the motors includes a permanent magnet-type rotor which allows the spacial gap between the rotor and the stator to be larger than it otherwise would be if the motors where of an induction-type. A network of damper bars and conductive wedges are provided around the array of magnets within the rotor both to reduce vibration-creating harmonic currents which might otherwise flow through the magnets, as well as to assist in the starting of the motor.

Finally, the housing which encloses both of the thrust bearings preferably includes a removable cover for affording easy access to either of the bearings incident to a maintenance or replacement operation.

BRIEF DESCRIPTION OF THE SEVERAL FIGURES

DETAILED DESCRIPTION OF THE PREFERRED EMBODIMENT

Figure 1:
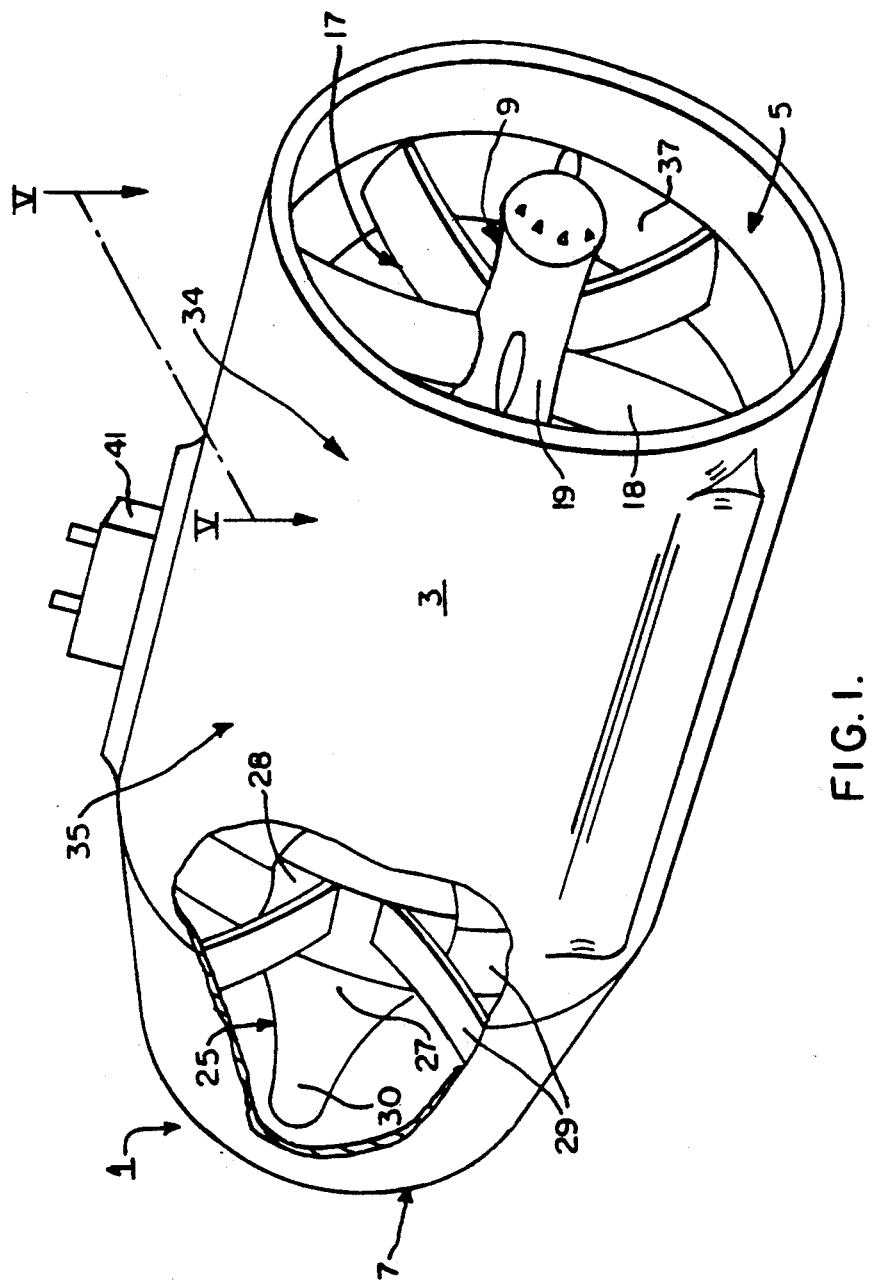
FIG. 1 is a prospective view of the two-stage submersible propulsor unit of the invention.
Figure 3:
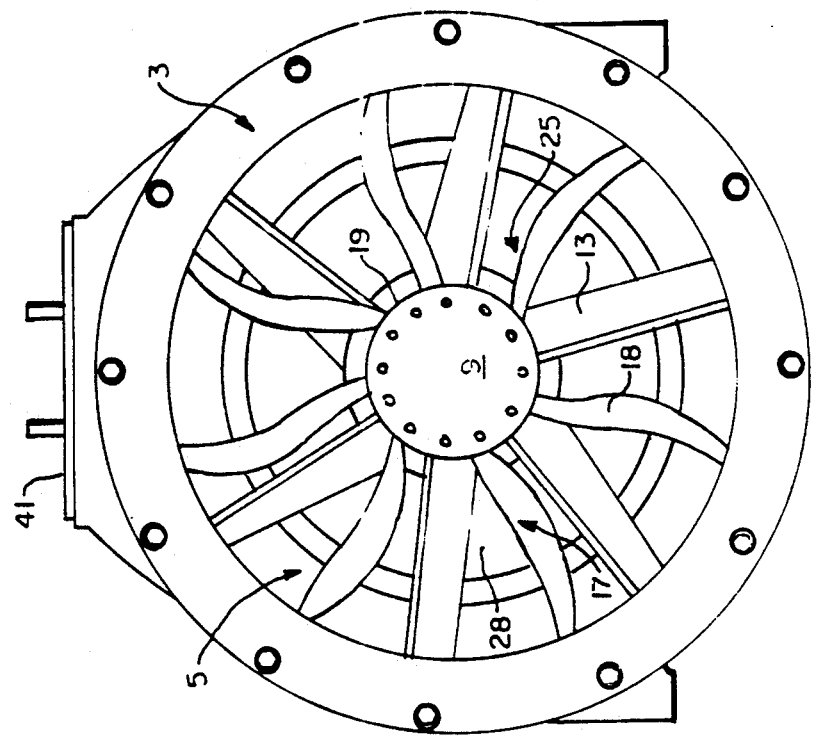
FIGS. 2 and 3 are back and front view of the propulsor unit illustrated in FIG. 1, respectively.
Figure 2:
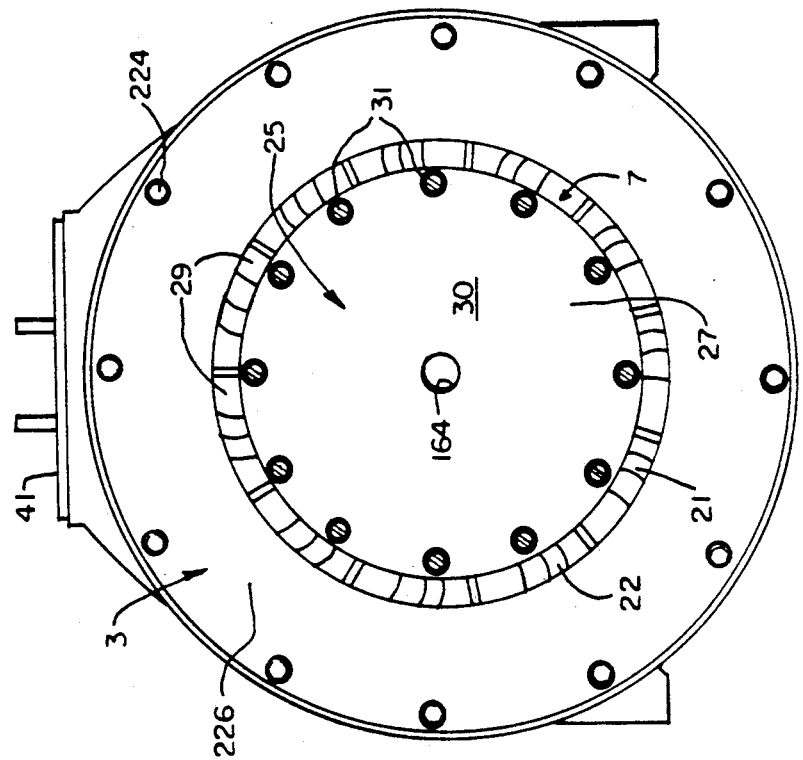

With reference now to FIGS. 1, 2, 3 and 4, wherein like reference numerals designate like components throughout all the several figures, the propulsor unit 1 of the invention generally comprises a shroud assembly 3 having an inlet 5, and an outlet 7 whose interior is generally shaped like a fluted converging nozzle. A shaft assembly 9 is mounted along the axis of rotation of the interior of the shroud assembly 3 by two sets of support vanes 13 and 29. The shaft assembly 9 includes an exterior, stationary tubular shaft 11 that is secured in place within the shroud assembly 3 by means of a plurality of radially extending forward vanes 13 which are in turn fastened to the shaft 11 by means of a locking ring 14 (see FIG. 4). The interior, rotating shaft 16 is concentrically disposed within the exterior, stationary tubular shaft 11. This rotating shaft 15 includes a centrally disposed bore 16 for conducting cooling and lubricating water to the dual thrust bearing assembly 25 of the propulsor unit 1. A front propeller 17 is provided with a plurality of radially extending blades 18 which converge into a hub 19. The hub 19 is in turn radially supported around the upstream end of the exterior, stationary shaft 11 as shown. Similarly, back propeller 21 is provided with radially extending blades 22 which converge into a hub 23 that is in turn rotatably supported around a downstream portion of the exterior, stationary shaft 11. In operation, the front propeller 17 advantageously "super charges" the back propeller 21 for improved efficiency in the generation of thrust. Accordingly, the back propeller 21 is preferably operated at a somewhat higher rotational speed than the front propeller 17. Additionally, the pitch of the blades 18 and 21 of the front propeller 17 and back propeller 21 is preferably opposite with respect to one another so that the two propellers 17 and 21 may be counter-rotated, which eliminates or at least reduces the torque that the propulsor unit 1 applies to the vessel that it moves.

Figure 4:
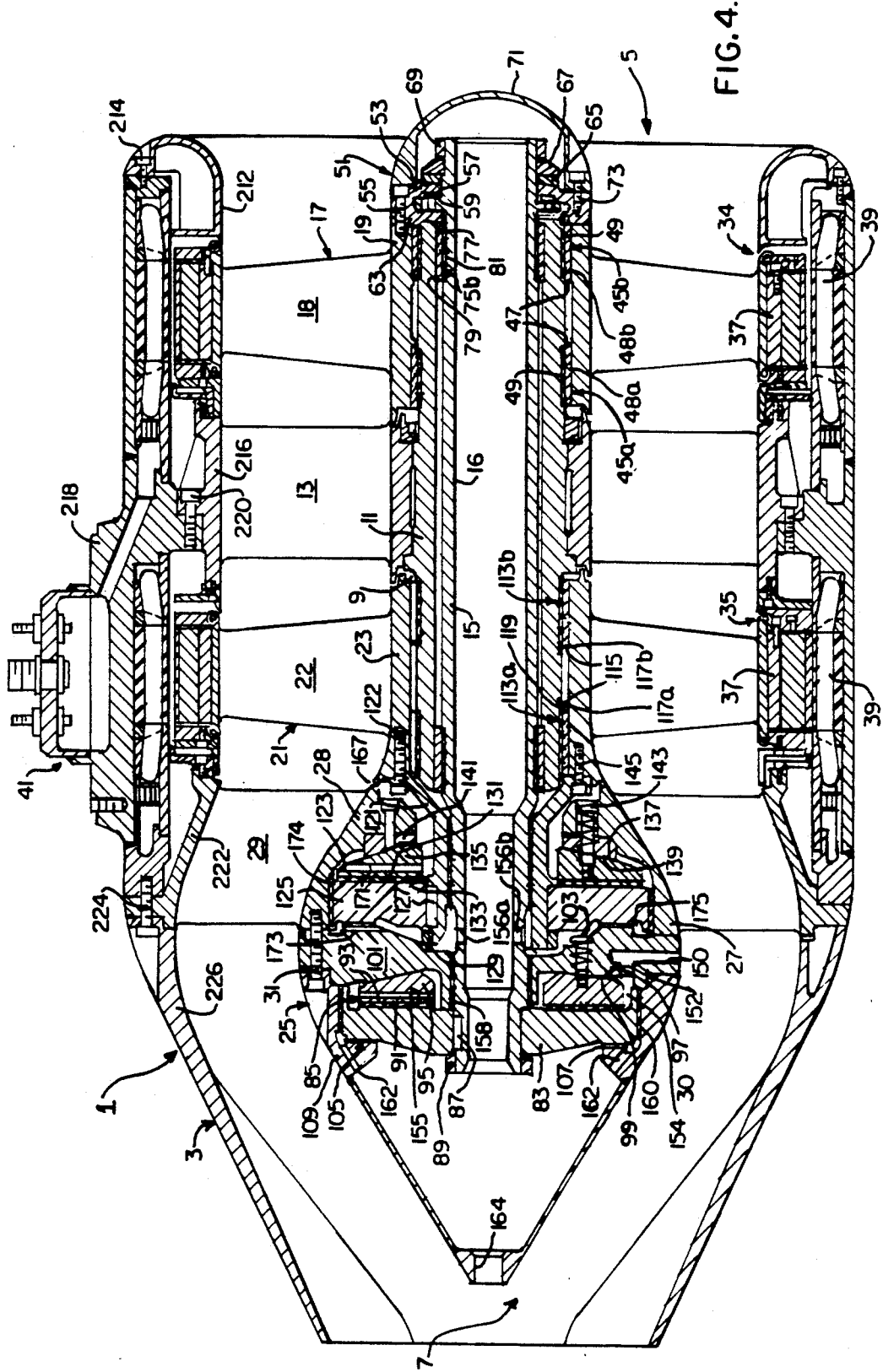
FIG. 4 is a cross-sectional side view of the propulsor unit illustrated in FIG. 1.

With specific reference now to FIG. 4 the propulsor unit is equipped with a dual thrust bearing assembly 25 that absorbs the thrust loads generated between the front and back propellers 17 and 21 and the exterior, stationary shaft 11 of the shaft assembly 9. The entire thrust bearing assembly 25 is contained within a teardrop shaped bearing house 27 whose fluid-dynamic profile complements the exit nozzle profile of the downstream end of the shroud assembly 3 so as to minimize flow resistance in this area. The bearing housing 27 includes a frusto-conically shaped housing support member 28 which is held in concentrical alignment with the shroud assembly 3 by means of the rearward set of vanes 29. The bearing housing 27 further includes a cone-shaped, removable rear cover 30 which is detachably fastened to the housing support member 28 by means of bolts 31. A detailed description of the thrust bearings contained within the bearing housing 27 is given hereinafter.

Front and back electric motors 34,35 separately drive the front and back propellers 17,21. Each of these electric motors includes a rotor that is connected around the peripheries of the blades 18,22 of the front and back propellers 17,21, as well as a stator 39 mounted within the shroud assembly 3 which circumscribes the rotor 37 of each of the motors 34,35. A terminal assembly 41 is provided at the top side of the propulsor unit 1 for supplying electrical power to the stators 39 of each of the motors 34,35. While the motors 34,35 may each be an induction-type, asynchronous electric motor, permanent-magnet motors are preferred due to the greater efficiency in converting electrical power into useful work. The use of permanent-magnet motors further allows the gap between the rotor 37 and stator 39 of each of the motors 34,35 to be increased, which advantageously reduces the noise generated by the propulsor unit 1. It should be noted that the use of separate electric motors 34,35 to drive two different, mechanically independent propellers 17,21 whose thrust bearings are also independent affords a valuable redundant thrust-generating capacity to the propulsor unit 1 which allows the unit to generate usable thrust if either of the electric motors 34,35 or either of the propellers 17,21 becomes damaged or otherwise inoperable.

Turning now to a more detailed description of the mechanical interfacing between the front propeller 17 and the exterior, stationary shaft 11, a pair of radial bearings 45a,b are disposed between the hub 19 of the front propeller 17, and the stationary shaft 11. Each of these radial bearings 45a,b is formed from a tubular bushing 47 which fits inside an annular recess 48a,b located on the inner diameter of the hub 19. Each of these bushings 47 is preferably formed from a bearing material such an Monel ®. Each of the radial bearings 45a,b further includes an elastomeric ring 49 which lines the inner diameter of the tubular bushing 47. The interior, rotating shaft 19 of the shaft assembly 9 transfers the thrust generated by the front propeller 17 to the dual thrust bearing assembly 25. To this end, a universal joint 51 having an annular member 53 that is connected to the leading edge of the hub 19 by means of bolts 55 is provided. This annular member 53 includes a plurality of cylindrical recesses 57 for receiving the heads 59 of securing nuts 61 present around an integrally-formed annular flange 63 that circumscribes the upstream end of the rotatable shaft 15. The "play" afforded between the heads of the securing nuts 61, and the cylindrical recesses 57 located in the annular member 53 allows the universal joint 51 to compensate for any unwanted non-concentricities between the hub 19, and the rotating shaft 15. The inner portion of the annular member 53 is maintained in place over the flange 63 by means of a wobble ring 65 and spacing ring 67 which are in turn secured in place over the upstream end of the rotating shaft 15 by means of an annular lock nut 69. The complementary, convex/concave surfaces that engage one another between the annular member 53 and wobble ring 65 again assist the universal joint 51 in compensating for misalignments between the annular member 53 and the flange 63. A semi-spherical end cap 71 is detachably mounted over the annular member 53 of the universal joint 51 by means of bolts 73. Additionally, a pair of spaced apart, radial bearings 75a,b are disposed between the outer diameter of the interior, rotating shaft 15, and the inner diameter of the exterior, stationary shaft 11. As was the case with the previously described radial bearings 45a,b, each of these radial bearings 75a,b includes a tubular bushing 77 formed from Monel ® that is disposed in a recess 79a,b, respectively. Elastomeric rings 81 line the inner diameters of each of the tubular bushings 77. The radial bearings 75a,b not only serve to reduce the friction between the interior and exterior shafts 15,11; they also help to maintain these shafts in concentric alignment.

The downstream end of the interior, rotating shaft 15 is connected to the runner 83 of the front propeller primary thrust bearing 85 by means of a key 87 which prevents relative rotation from occurring between these two components, and an annular lock nut 89. An elastomeric runner plate 91 is located on the upstream side of the runner 83. This runner plate 91 engages against a circular bearing surface 93 which defines the downstream end of a stationary bearing plate 95. The upstream side of the bearing plate 94 includes a convex surface which is complementary in shape to the concave surface of a bearing support plate 101. This bearing support plate 101 is stationarily secured to the previously described housing support member 28 of the bearing housing 27 through bolts 31. A plurality of spring-loaded stud assemblies 103 interconnect the bearing plate 95 with the bearing support plate 101, while still allowing some degree of "wobble" to occur between the convex and concave surfaces 97,99. The ability of the convex and concave surfaces 97,99 to move a small degree with respect to one another again helps to compensate for any misalignments between the runner 83, the bearing plate 95, and the bearing support plate 101. The runner 83 further serves as a runner for use in a front propeller secondary thrust bearing 105. This secondary thrust bearing 105 is defined between the back surface 107 of the runner 83, and an annular ledge 109 disposed within the removable rear cover 30 of the bearing housing 27. The front propeller secondary thrust bearing 105 advantageously bears the thrust load generated by the front propeller when the front propeller is allowed to "windmill", or when the propulsor unit 1 is run in reverse.

With reference now to the interface between the back propeller 21 the exterior, stationary shaft 11, and the dual thrust bearing assembly 25, the hub 23 of the back propeller 21 is rotatably mounted around the exterior, stationary shaft 11 by means of a pair of radial bearings 113a,b. Each of these radial bearings 113a,b includes a tubular bushing 115 formed from Monel ® which is mounted within annular recesses 117a,b present in the inner diameter of the hub 23. Elastomeric rings 119 line the inner diameters of each of the tubular bushings 115. A thrust sleeve 121 that is connected to the hub 23 by means of bolts 122 conducts the thrust generated by the back propeller 21 to a back propeller primary thrust bearing 123. Like the previously described front propeller primary thrust bearing 105, this back propeller bearing 123 includes a runner 125 that is secured onto the downstream end of the thrust sleeve 123 by means of a key 127 that prevents relative rotation from occurring between these two parts, and an annular lock nut 129. An elastomeric runner plate 131 is provided on the upstream face of the runner 123. This elastomeric runner plate 131 engages against a bearing surface 133 present on the downstream face of a bearing plate 135. The upstream face of the bearing plate 135 includes a convex surface which is complementary in shape to the concave surface 139 of another bearing support plate 141. Spring loaded stud assemblies 143 allow a limited degree of relative movement between the bearing plate 135, and the bearing support plate 141 which helps to compensate for small, unwanted misalignments which may occur between these two components. This bearing support plate 141 is secured onto the housing support member 28 by means of bolts 145. Like the previously described runner 83 of the front propeller primary thrust bearing 85, the runner 125 also serves as the runner for a back propeller secondary thrust bearing 146 which is defined between an annular, downstream surface 148 on this component and the front surface 149 of the bearing support plate 101. This back propeller secondary thrust bearing 146 bears thrust loads generated by the "windmilling" of the back propeller, or when the unit 1 is run in reverse.

All of the thrust bearings within the dual thrust bearing assembly 25 are both water lubricated and water cooled. To this end, a peripheral radial bore 150 is provided in the support plate 110. This radial bore 150 terminates in a transverse bore 152 which leads to an annular space 154. This annular space 154 in turn communicates with the outer edges of the interface between the elastomeric runner plate 151 connected to the runner 83, and the downstream bearing surface 93 of the bearing plate 95. The annular space 154 also communicates with a first internal radial bore 155 present in the support plate 101. This radial bore 155 conducts ambient sea water flowing through the shroud 3 of the unit 1 to the inner diameter of the interface between the elastomeric runner plate 91, and the bearing surface 93 of the bearing plate 95. Radially disposed exit bores 156a,b are provided in the interior, rotating shaft 15 of the shaft assembly 9. These exit bores 156 communicate with the central bore 16 present in the interior, rotating shaft 15. It should be noted that the bore 16 in turn communicates with ambient sea water through the open end of the removable rear cover 30 of the bearing housing 27. In order to prevent the water flowing through the first internal radial bore 155 in the support plate 101 from flowing exclusively through the exit bores 156a,b, or through the exit bores 162 provided in the ledge 109 of the removable rear cover 30 of the bearing housing 27, labyrinth paths 158,160 are provided in the locations shown. The previously alluded-to exit port 164 located at the rear of the removable cover 30 places the exit bores 162 into communication with ambient sea water.

Turning now to the water flow paths associated with the lubrication and cooling of the back propeller primary and secondary thrust bearings 123,146, a water-receiving radial gap 167 is provided between the hub 23 of the back propeller 21, and the housing support member 28. This radial gap 167 is tortuous in design so as to discourage the entrance of debris entrained in sea water. This radial gap 167 leads to a radial space 169 that in turn communicates with an internal radial bore 171 located in the support plate 141. Sea water exiting the bore 171 in turn communicates with a second internal radial bore 173 by way of a labyrinth path 174, and an annular, water conducting space 175. Again, the presence of the labyrinth path 174 prevents water flowing through the internal radial bore 171 from flowing unobstructedly around the runner 125, through the secondary internal radial bore 173, and out through the exit bores 166a,b located in the interior, rotating shaft 15. The pressure drop generated by the presence of this labyrinth path 174 helps to direct a cooling, lubricating flow of sea water between the elastomeric runner plate 131, and the bearing surface 133 of the bearing plate 135, as well as through the surface of the previously-described back propeller secondary thrust bearing 146.

Figure 6:
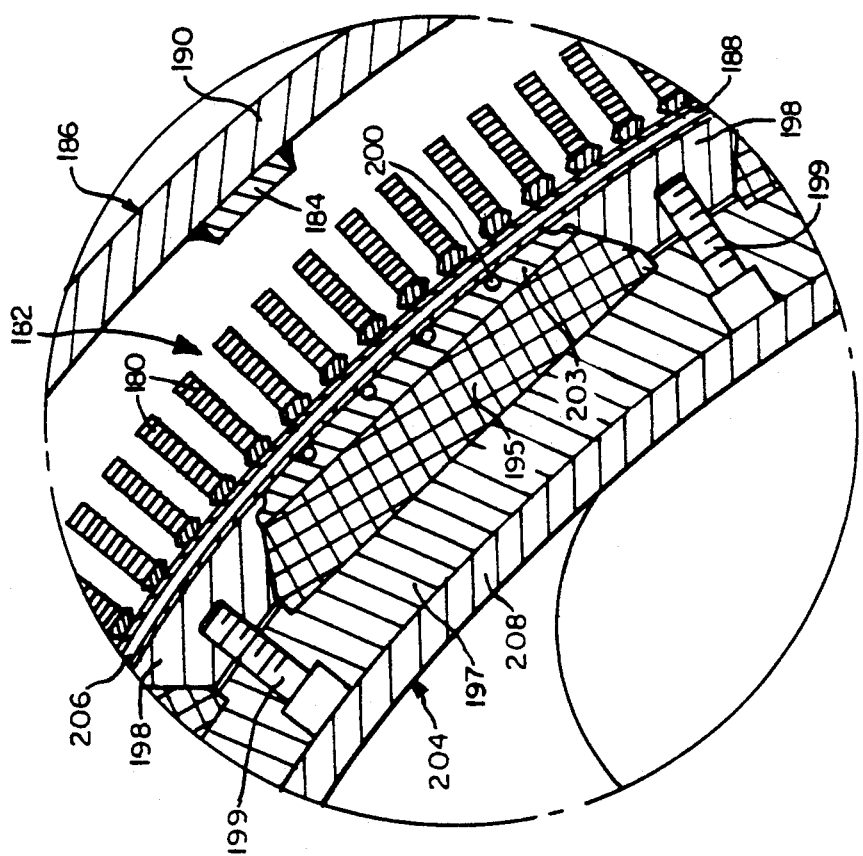
FIG. 6 is an enlargement of the area enclosed by the dotted circle in FIG. 5, illustrating structural details of both the rotor and the stator of one of the electric motors used in the invention.
Figure 5:
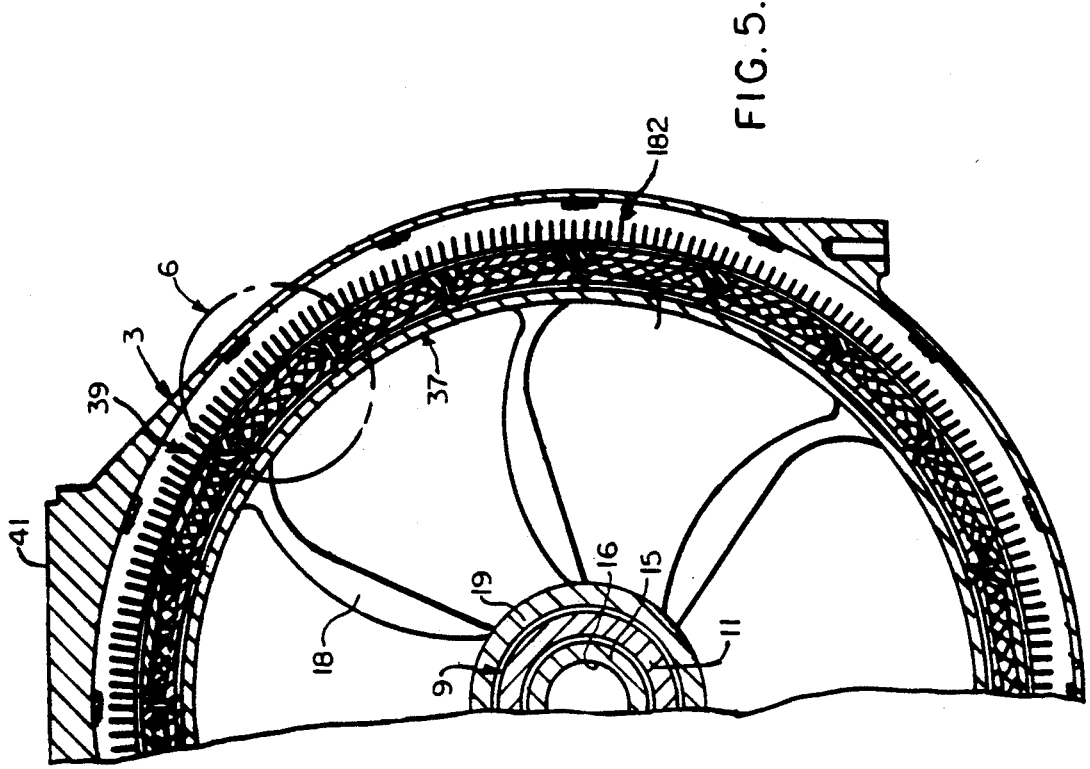
FIG. 5 is a partial cross-sectional view of the propulsor unit illustrated in FIG. 1 along the line 5—5.

FIGS. 5 and 6 illustrate the details of the electric motors 34,35 used to rotate the front and back propellers 17,21. As has been indicated earlier, each of the electric motors 34,35 is an alternating current motor that generally consists of a rotor 36 mounted around the periphery of the blades 18,22 of the propellers 17,21 that is in turn closely surrounded by a stator 39 which is "canned" within the shroud assembly 3. In the preferred embodiment, each of the electric motors 34,35 is preferably of the permanent-magnet type. While induction type ac motors might also be used, permanent-magnet ac motors are preferred for two reasons. First, a permanent-magnet motor provides about 10 percent better efficiency over an induction-type motor in converting electrical current into usable thrust. Secondly, this higher efficiency can be realized with a somewhat larger spacial gap between the outer periphery of the rotor 37, and the inner periphery of the stator 39. In an operational propulsor unit 1, this larger gap may be as wide as 0.50 inches (or 1.31 centimeters), in contrast to a gap of 0.25 inches or less associated with an induction-type motor. The use of a larger (as opposed to a smaller) gap advantageously reduces both the frictional drag between the rotor 37 and the stator 39 which are caused by the turbulent film of sea water between these two components and further reduces the amount of noise generated at this particular location of the propulsor unit 1. Other advantages include the generation of smaller amounts of harmonic current (caused by unwanted dissymmetries in the magnetic field generated by the stator windings), and consequent lower vibrations caused by the interaction of such currents on the rotor 37. Vibrations caused by any off-center wobble" of the rotor 37 as it rotates within the stator 39 are also reduced. Finally, the larger gap afforded by the use of permanent magnets in the motors 34,35 makes it less likely that the rotation of the rotor 37 within the stator 39 of either unit could be impeded or stopped by the deposition of foreign matter in this gap by sea water, and further renders the entire unit 1 more resistant to external shocks, as the unit 1 would be more tolerant to any shock-induced damage which tended to knock the rotor 37 off-center with respect to the stator 39 of either of the motors 34,35. All these are significant advantages, particularly in the context of summary and applications.

As may best be seen with respect to FIG. 6, the stator 39 includes a plurality of uniformly spaced stator core windings 180. Each of the stator core windings 180 is ultimately connected to the lead wires of the terminal post assembly 41. Moreover, each of the stator core windings 180 is received in a stator core 182 formed from rings of laminated magnetic steel that conduct the magnet field generated by the windings 180 but retard the conduction of unwanted eddy currents. A plurality of building bars 184 are welded around the outer diameter of the annular laminations forming the stator core 182 in order to rigidify the core 182, and to affix the stator core winding-receiving slots present on the inner diameter of each of these rings into mutual registration with one another. The entire stator 39 is contained within a water tight stator housing 186 having an inner wall 188 that faces the outer periphery of the rotor 37, and an outer wall 190 which forms part of the exterior of the shroud assembly 3.

The rotor 37 of each of the electric motors 34,35 is formed from a plurality of trapezoidally shaped magnets 195 mounted within a magnet housing ring 197 formed from carbon steel. Each of the magnets 195 is preferably formed from an alloy of NbBFe because of the excellent magnetic field capacity and B-H curve characteristics of this material. Each of the magnets 195 is maintained within the magnet housing ring 197 by zirconium-copper rotor wedges 198 secured to the ring 197 by means of bolts 199. In the preferred embodiment, about 20 such trapezoidally shaped magnets 195 are incorporated within the rotor 37. Four damper bars 200 that are formed from solid copper rods are stretched over the upper ends of each of the magnets 195. These damper bars 200 are disposed within recesses in pole cap members 203 secured over the top ends of each of the magnets 195. The purpose of the damper bar 200 and the rotor wedges 198 is to protect the magnets 195 from any electrical currents harmonically induced into the top surface of the rotor 37 as the result of unwanted dissymmetries in the magnetic field created by the stator coil windings 180. More specifically, any such harmonic currents will be concentrated within the highly conductive damper bars 200 and rotor wedges 198 which in turn will harmlessly dissipate them. If the damper bars 200 and rotor wedges 198 were not present in the rotor 37, such harmonically-induced currents would flow directly through the bodies of the magnets 195, and ultimately act to de-magnetize them. Additionally, the combination of damper bars 200 and rotor wedges 198 forms a sort of squirrel-cage structure that facilitates the starting of the rotor 37. The rotor 37 is hermetically sealed within a rotor housing 204 having an outer wall 206 that faces the previously mentioned inner wall 188 of the stator housing 186, as well as an inner wall 208 that connects the peripheral ends of the blades 18,22 associated with the front and back propellers 17,21.

With reference in particular to FIG. 4, the shroud assembly 3 includes a rounded, front fairing member 212 that is connected onto the upstream wall of the stator housing 186 of the front propeller 17 by means of bolts 214. Located just downstream of this stator housing is an upstream support member 216 that integrally connects the outer ends of the forward set of vanes 13 to the inner diameter of the shroud assembly 3. This upstream support member 216 is connected to the inner diameter of a central support frame 218 by means of bolts 220. On the downstream side of the stator 39 of the propeller 21 is a downstream support ring 222. This ring 222 interconnects the rearward vanes 29 with the shroud assembly 3, and is fastened to the central support frame 218 by means of bolts 224. These same bolts 224 also serve to connect the fluted nozzle 226 which forms the downstream portion of the shroud assembly 3 to the central support frame 218.

I claim:

1. A submersible propulsor unit, comprising:
a shroud having a water inlet and a water outlet;
a shaft assembly centrally mounted within said shroud between said water inlet and outlet;
first and second propellers, each of which includes a separate hub rotatably mounted on said shaft assembly, wherein said second propeller is located downstream of said first propeller;
first and second electric motors for separately rotating said first and second propellers, wherein each motor includes a rotor mounted around the outer periphery of one of said propellers, and a stator mounted on said shroud around said rotor, and
first and second thrust bearing assemblies for absorbing the thrust load generated between the hubs of said first and second propellers and said shaft assembly, respectively, wherein said thrust bearing assemblies are both located on the downstream end of the shaft assembly downstream of said second propeller.

2. A submersible propulsor unit as defined in claim 1, further comprising a plurality of vane members for supporting said shaft assembly within said shroud, wherein said vane members are all located downstream of said first propeller to reduce noise generated by said unit.

3. A submersible propulsor unit as defined in claim 1, wherein said shaft assembly includes a stationary outer shaft where the hubs of said first and second propellers are rotatably mounted, and an inner shaft that is rotatable with respect to the outer shaft and which is connected to the hub of the first propeller for transferring thrust from said first propeller to the first thrust bearing assembly.

4. A submersible propulsor unit as defined in claim 3, further comprising a universal joint between the hub of said first propeller and said rotatable inner shaft for compensating for any off-center distances between said hub and said rotatable inner shaft.

5. A submersible propulsor unit as defined in claim 2, wherein said plurality of vane members includes first and second sets of vane members, said first set being disposed between a portion of said shaft assembly located between the hubs of said first and second propellers, and said shroud.

6. A submersible propulsor unit as defined in claim 1, further comprising a bearing housing for containing the first and second thrust bearing assemblies, wherein said housing includes a removable cover for affording access to said thrust bearing assemblies.

7. A submersible propulsor unit as defined in claim 5, further comprising a bearing housing for containing the first and second thrust bearing assemblies wherein said second set of vane members are connected between said housing and said shroud.

8. A submersible propulsor unit as defined in claim 5, wherein said second set of vane members are fluidically shaped to convert a swirling flow of water expelled from the outlet of the second propeller to an axial flow of water.

9. A submersible propulsor unit as defined in claim 1, wherein said first and second thrust bearings are mechanically independent of one another.

10. A submersible propulsor unit as defined in claim 1, wherein the rotors of said first and second electric motors each include permanent magnets to increase the spacing between the rotor and stator to thereby decrease the noise generated by said rotor as well as the frictional drag imposed on said rotor.

11. A submersible propulsor unit, comprising:
a shroud having a water inlet and a water outlet;
a shaft assembly having a stationary outer shaft centrally mounted within said shroud between said water inlet and outlet, and a rotatable inner shaft;

first and second propellers, each of which includes a separate hub rotatably mounted on said stationary outer shaft, said second propeller being located downstream of said first propeller;

first and second electric motors for separately rotating said first and second propellers, wherein each motor includes a rotor mounted around the outer periphery of one of said propellers, and a stator mounted on said shroud around said rotor, and first and second thrust bearing assemblies for absorbing the thrust load generated between the hubs of said first and second propellers and said shaft assembly, respectively, said thrust bearing assemblies both being located on the downstream end of the shaft assembly, wherein said rotatable inner shaft of said shaft assembly conducts the thrust load generated by said first propeller to said first thrust bearing assembly.

12. A submersible propulsor unit as defined in claim 11, further comprising a plurality of vane members for supporting said shaft assembly within said shroud, wherein said vane members are all located downstream of said first propeller to reduce noise generated by said unit.

13. A submersible propulsor unit as defined in claim 11, further comprising a universal joint between the hub of said first propeller and said rotatable inner shaft for compensating for any off-center distances between said hub and said rotatable inner shaft.

14. A submersible propulsor unit as defined in claim 12, wherein said plurality of vane members includes first and second sets of vane members, said first set being disposed between a portion of said shaft assembly located between the hubs of said first and second propellers, and said shroud.

15. A submersible propulsor unit as defined in claim 11, further comprising a bearing housing for containing the first and second thrust bearing assemblies, wherein said housing includes a removable cover for affording access to said thrust bearing assemblies.

16. A submersible propulsor unit as defined in claim 14, further comprising a bearing housing for containing the first and second thrust bearing assemblies wherein said second set of vane members are connected between said housing and said shroud.

17. A submersible propulsor unit as defined in claim 14, wherein said second set of vane members are fluidically shaped to convert a swirling flow of water expelled from the outlet of the second propeller to an axial flow of water.

18. A submersible propulsor unit as defined in claim 11, wherein said first and second thrust bearings are mechanically independent of one another.

19. A submersible propulsor unit as defined in claim 11, wherein the rotors of said first and second electric motors each include permanent magnets to increase the spacing between the rotor and stator to thereby decrease the noise generated by said rotor as well as the frictional drag imposed on said rotor.

20. A submersible propulsor unit as defined in claim 11, wherein each of said bearing assemblies includes a primary thrust bearing for absorbing the load generated when said propellers generate forward thrust, and a secondary thrust bearing for absorbing the load generated when said propellers generate backward thrust.

21. A submersible propulsor unit, comprising:
a shroud having a water inlet and a water outlet;
a shaft assembly centrally mounted within said shroud between said water inlet and outlet;
first and second propellers, each of which includes a separate hub rotatably mounted on said shaft assembly, wherein said second propeller is located downstream of said first propeller;
first and second electric motors for separately rotating said first and second propellers, wherein each motor includes a rotor mounted around the outer periphery of one of said propellers, and a stator mounted on said shroud around said rotor, said rotor including permanent magnets for increasing the spacing between the rotor and the stator to thereby decrease the noise generated by the rotor as well as the frictional drag imposed on said rotor;
first and second thrust bearing assemblies for absorbing the thrust load generated between the hubs of said first and second propellers and said shaft assembly, respectively, wherein said thrust bearing assemblies are both located on the downstream end of the shaft assembly;
a plurality of vane members for supporting said shaft assembly within said shroud, wherein said vane members are all located downstream of said first propeller to further reduce noise generated by said unit.

22. A submersible propulsor unit as defined in claim 21, wherein said shaft assembly includes a stationary outer shaft where the hubs of said first and second propellers are rotatably mounted, and an inner shaft that is rotatable with respect to the outer shaft and which is connected to the hub of the first propeller for transferring thrust from said first propeller to the first thrust bearing assembly.

23. A submersible propulsor unit as defined in claim 22, further comprising a universal joint between the hub of said first propeller and said rotatable inner shaft for compensating for any off-center distances between said hub and said rotatable inner shaft.

24. A submersible propulsor unit as defined in claim 21, wherein the downstream portion of the shroud defines a fluted nozzle for breaking up the exhausting stream of water into a plurality of smaller streams to further reduce the noise generated by the unit.

25. A submersible propulsor unit as defined in claim 21, further comprising a variable frequency source of alternating current power for independently powering each of
said electric motors and for adjusting the rotational speed of said first and second propellers.

* * * * *